(12) United States Patent
Schagerl et al.

(10) Patent No.: US 12,372,115 B2
(45) Date of Patent: Jul. 29, 2025

(54) BEARING ASSEMBLY

(71) Applicant: Voith Patent GmbH, Heidenheim (DE)

(72) Inventors: Robert Schagerl, St. Leonhard am Forst (AT); Martin Schabasser, Pfaffing (AT)

(73) Assignee: Voith Patent GmbH, Heidenheim (DE)

( * ) Notice: Subject to any disclaimer, the term of this patent is extended or adjusted under 35 U.S.C. 154(b) by 84 days.

(21) Appl. No.: 18/515,986

(22) Filed: Nov. 21, 2023

(65) Prior Publication Data

US 2024/0084851 A1 Mar. 14, 2024

Related U.S. Application Data

(63) Continuation of application No. PCT/EP2022/059583, filed on Apr. 11, 2022.

(30) Foreign Application Priority Data

Jun. 14, 2021 (DE) ..................... 10 2021 115 285.2

(51) Int. Cl.
*F16C 33/10* (2006.01)
*F16N 31/00* (2006.01)
*F16C 17/02* (2006.01)

(52) U.S. Cl.
CPC ........ *F16C 33/105* (2013.01); *F16C 33/1085* (2013.01); *F16N 31/00* (2013.01); *F16C 17/02* (2013.01); *F16N 2200/14* (2013.01); *F16N 2210/14* (2013.01)

(58) Field of Classification Search
CPC .......... F16C 17/02; F16C 17/26; F16C 33/26; F16C 33/1045; F16C 33/105; F16C 33/106; F16C 33/1085; F16N 31/00; F16N 2200/14; F16N 2210/14

See application file for complete search history.

(56) References Cited

FOREIGN PATENT DOCUMENTS

| DE | 39 30 872 A1 | 3/1991 |
|----|---|---|
| DE | 10 2006 058 343 A1 | 7/2008 |
| DE | 10 2007 029 549 A1 | 1/2009 |

(Continued)

OTHER PUBLICATIONS

Notification of the Transmission of the International Search Report and Written Opinion of the International Search Authority or Declaration dated Jul. 15, 2022 for International Application No. PCT/EP2022/059583 (13 pages).

*Primary Examiner* — Phillip A Johnson
(74) *Attorney, Agent, or Firm* — TAYLOR & EDELSTEIN, PC

(57) ABSTRACT

A bearing assembly includes: a shaft; a housing; a support structure; at least one first seal; at least one electrode connected to the support structure and arranged between the support structure and the shaft such that an oil vapor from the oil bath, which passes through the at least one first seal, must pass through a gap between the at least one electrode and the shaft in order to escape, the bearing assembly being configured for an electrical voltage to be applied between the at least one electrode and the shaft so as to direct oil particles contained in the oil vapor onto the at least one electrode such that the oil particles are separated at the at least one electrode; and a drainage channel configured for enabling oil separated at the at least one electrode to flow through the drainage channel into the oil bath.

7 Claims, 2 Drawing Sheets

(56) References Cited

FOREIGN PATENT DOCUMENTS

| | | |
|---|---|---|
| DE | 10 2008 011 561 A1 | 9/2009 |
| DE | 10 2020 104 960 B3 | 12/2020 |
| JP | 8-326756 | 12/1996 |
| RU | 2 161 730 C2 | 1/2001 |
| WO | WO-9730273 A1 * | 8/1997 ............ F01D 25/18 |

* cited by examiner

BEARING ASSEMBLY

CROSS REFERENCE TO RELATED APPLICATIONS

This is a continuation of PCT application no. PCT/EP2022/059583, entitled "BEARING ASSEMBLY", filed Apr. 11, 2022, which is incorporated herein by reference. PCT application no. PCT/EP2022/059583 claims priority to German application no. 10 2021 115 285.2, filed Jun. 14, 2021, which is incorporated herein by reference.

BACKGROUND OF THE INVENTION

1. Field of the Invention

The present invention relates to bearing assemblies.

2. Description of the Related Art

RU 2 161 730 C2 for example, cites such a bearing assembly. To prevent oil vapor escaping from the bearing housing, an oil vapor extraction system is used. An oil vapor extraction system represents a cost factor and in addition causes ongoing operating costs and ongoing energy consumption.

What is needed in the art is a bearing assembly which prevents the escape of oil vapor as far as possible without having to provide an oil vapor extraction system.

SUMMARY OF THE INVENTION

The invention relates to a bearing assembly wherein lubrication of the bearing occurs via an oil bath. Bearing assemblies of this type are used in particular in hydropower plants.

The present invention provides a bearing assembly including shaft (1), housing (2), oil bath (3) arranged inside housing (2), support structure (4) which is connected to housing (2) and arranged around shaft (1), and at least one first gasket (6) which is supported by support structure (4) and which extends between support structure (4) and shaft (1), characterized in that, the bearing assembly includes at least one electrode (5) which is connected to support structure (4) and arranged between support structure (4) and shaft (1) in such a way that oil vapor from oil bath (3), which passes through first seal (6), must pass through a gap between electrode (5) and shaft (1) in order to escape, and wherein the bearing assembly is designed in such a way that an electrical voltage can be applied between electrode (5) and shaft (1) in order to direct oil particles contained in the oil vapor onto electrode (5) so that the oil particles can be separated at electrode (5), and wherein the bearing assembly includes at least one drainage channel (8) which is designed in such a way that that oil separated at electrode (5) can flow through drainage channel (8) into oil bath (3).

Optionally, the bearing assembly includes a second seal (7) which is supported by support structure (4) and extends between support structure (4) and shaft (1), and wherein second seal (7) is arranged on the other side of electrode (5) when viewed from first seal (6).

Optionally, the bearing assembly includes a siphon (9) which is arranged in drainage channel (8) and wherein siphon (9) is arranged in such a way that it can fill with the oil deposited at electrode (5) and thereby seal drainage channel (8) in such a way that no oil vapor from oil bath (3) can pass through.

Optionally, shaft (1) is arranged horizontally.

Optionally, shaft (1) is arranged vertically.

Optionally, the bearing assembly includes ways for collecting the oil separated at electrode (5).

Optionally, the ways for collecting the oil separated at electrode (5) includes a projection of support structure (4), wherein the projection is arranged in such a way that separated oil at electrode (5) can drip onto the projection.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
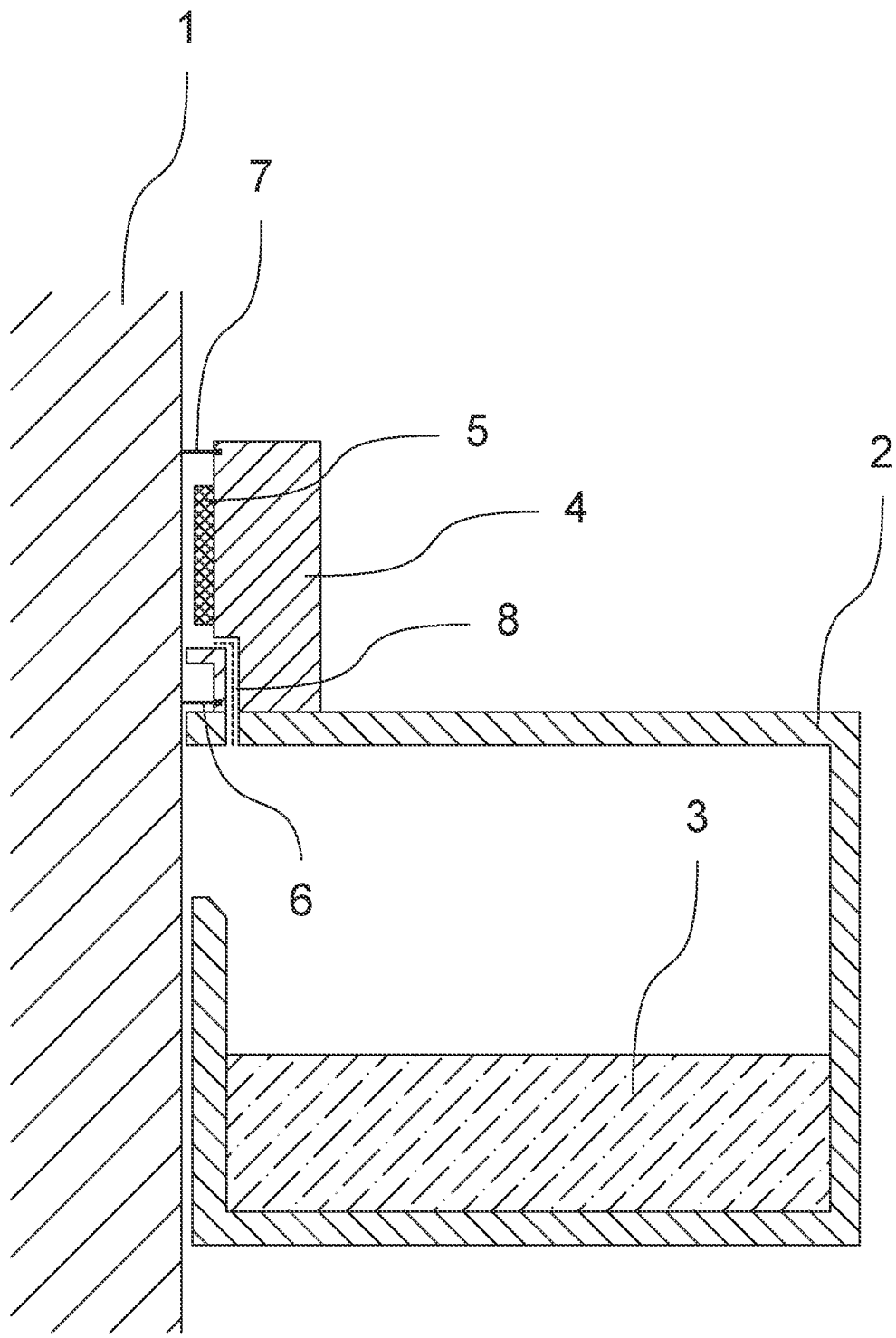
FIG. 1 is a first embodiment of a bearing assembly according to the present invention.

FIG. 1 is a schematic representation of a bearing assembly according to the present invention in a first embodiment. The bearing assembly consists of a shaft which is identified as 1, a housing, identified as 2, and a bath which is identified as 3 and contains oil. The embodiment illustrated in FIG. 1 is an embodiment having a vertically arranged shaft 1. Oil bath 3 is arranged inside the housing. Said oil bath 3 serves to lubricate and cool bearing surfaces and bearing segments which—for sake of clarity—are not illustrated in FIG. 1. The oil is thereby heated, leading to the formation of oil vapor or oil mist. To prevent the oil vapor from contaminating sensitive areas outside housing 2, the bearing assembly includes a first and a second seal, which are identified as 6 and 7 in FIG. 1. Seals 6 and 7 are supported by a support structure, which is identified as 4. Support structure 4 is connected to housing 2 and is arranged surrounding shaft 1. For this purpose, it is advantageous if support structure 4 is composed of several segments. Seals 6 and 7 extend between support structure 4 and shaft 1. Seals 6 and 7 shown in FIG. 1 are designed as blade seals. However, they could also be designed in any other known and appropriate manner. Since actual seals do not provide ideal sealing, other ways must be provided that can additionally prevent oil vapors from escaping.

In the bearing assemblies according to the state of the art, the oil vapor extraction systems referred to at the beginning are provided for this purpose. Therein, suction tubes flow into the space between seals 6 and 7, support structure 4 and shaft 1. In this known arrangement, seals 6 and 7 also serve to limit the suction volume flow.

In contrast, a bearing assembly according to the present invention includes at least one electrode which is identified as 5 in FIG. 1. Electrode or electrodes 5 are connected with support structure 4 and are arranged between support structure 4 and shaft 1 in such a way that oil vapor from oil bath 3, which passes through first seal 6, must pass through a gap between an electrode 5 and shaft 1 in order to escape. This means that electrode or electrodes 5 are arranged surrounding shaft 1, and that the seal 6 is arranged between oil bath 3 and electrode or electrodes 5.

It is known that oil particles can be deflected by an electric field. Therefore, the bearing assembly according to the present invention is designed in such a way that an electrical voltage can be applied between electrodes 5 and shaft 1 in order to direct oil particles contained in the oil mist onto electrodes 5 so that the oil particles can be separated at electrodes 5. Thus, the gas flowing through the gap between electrode 5 and shaft 1 is cleaned of oil. The desired effect described above can be optimized by the gap width and the axial length of electrodes 5. The axial length is the extension of electrodes 5 in the direction of the shaft axis. The smaller the gap width and the greater the axial length of electrodes 5 is selected, the more effectively the previously mentioned gas flow is cleaned of oil. This means that, according to the present invention, it may be possible to dispense with second seal 7, which is therefore to be regarded as optional. Viewed from first seal 6, optional second seal 7 is located in the axial direction on the other side of electrodes 5. Optionally, the bearing assembly can also include additional seals. These additional seals may for example be placed between first seal 6 and electrodes 5, or between second seal 7 and electrodes 5.

The oil separated from electrodes 5 runs off as an oil film following gravity. To drain off the separated oil, the bearing assembly includes at least one drainage channel, which is arranged in such a way that separated oil can flow through the drainage channel into the oil bath 3. In FIG. 1, the drainage channel is identified as 8.

In the embodiment shown in FIG. 1 with vertically arranged shaft 1, it is advantageous if ways are also provided to collect the separated oil. In FIG. 1, these ways include a projection of support structure 4, wherein the projection is arranged so that oil separated on electrodes 5 can drip onto the projection. Drainage channel 8 opens directly onto the top of the projection so that the oil collected by the projection can easily drain away. To improve drainage of the oil, the projection can be tilted in such a way that the incline causes the oil collected by the projection to flow towards the mouth of the drainage channel.

In embodiments with a horizontally arranged shaft 1, the separated oil collects at the lowest point of the surface of electrodes 5 facing shaft 1. For this purpose, it may be necessary for electrodes 5 to be located adjacent to each other in the circumferential direction so that the oil can flow from one electrode 5 to adjacent electrode 5. However, the oil may possibly also be able to overcome a possibly existing gap from one electrode 5 to adjacent electrode 5 in a dripping manner, for example as drops. Even in embodiments with a vertically arranged shaft 1, there may be gaps between electrodes 5 in the circumferential direction. However, it is advantageous in each case if the width of these gaps is not much greater than the width of the gap between shaft 1 and electrodes 5.

In embodiments with horizontally arranged shaft 1, the at least one drainage channel 8 opens into where separated oil collects, for example at the previously mentioned lowest point of the electrode surface. Another suitable outlet point is arranged in the axial direction next to electrode 5 at the lowest point of support structure 4. It is then advantageous if outlet openings are arranged on both axial sides of respective electrode 5.

Figure 2:
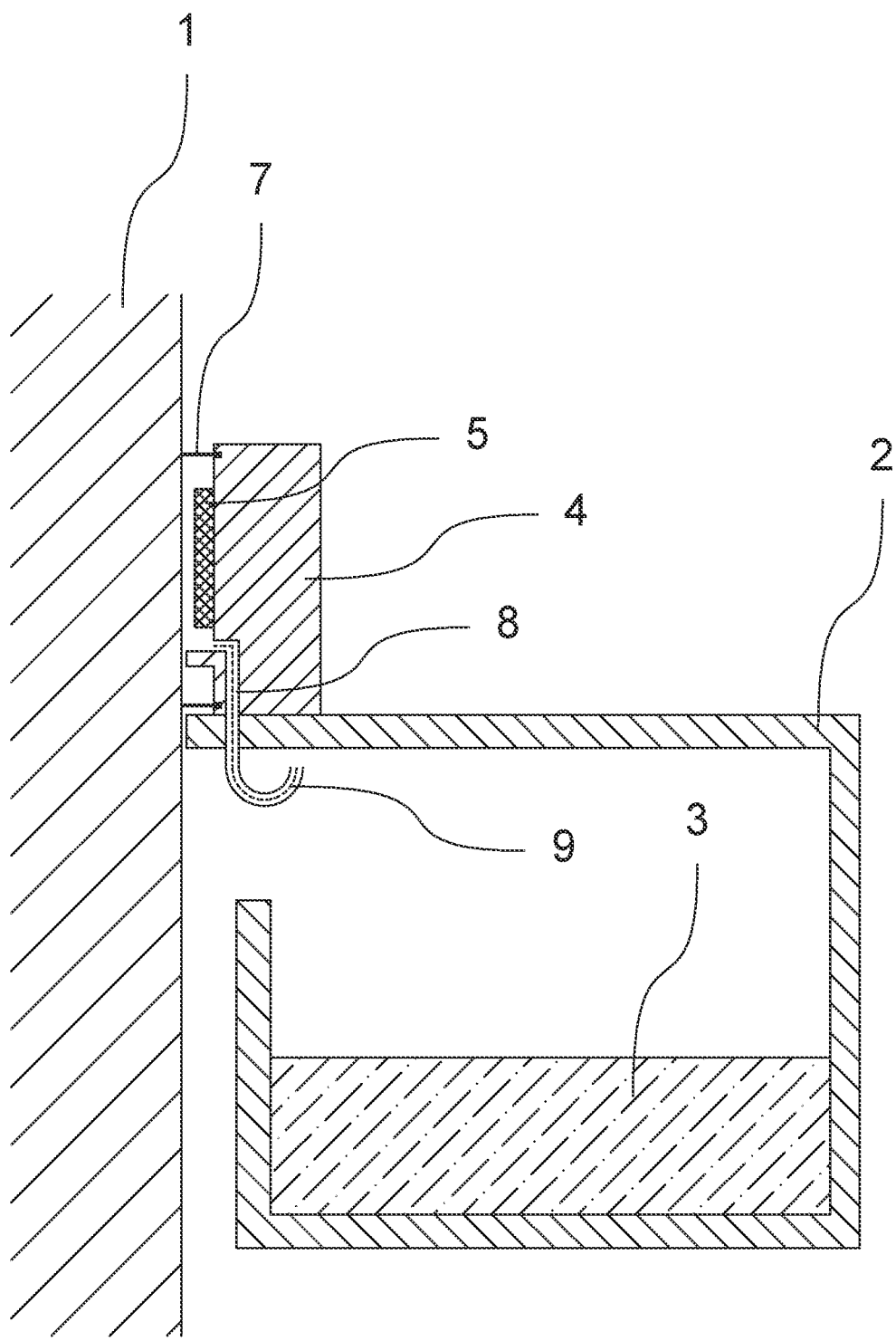
FIG. 2 is a second embodiment of a bearing assembly according to the present invention.

FIG. 2 shows another embodiment according to the present invention. The bearing assembly shown includes a siphon, which is identified as 9 and which is arranged in drainage channel 8. Siphon 9 is arranged in such a way that it can fill with separated oil and thereby seal drainage channel 8 in such a way that no oil vapor from oil bath 3 can pass through.

The bearing assembly according to the present invention can prevent the escape of oil vapor to the greatest possible extent without the need for an oil extraction system. The energy required to build up and maintain the static electric field between the shaft and the electrodes is much less than the energy consumption of an oil extraction system.

In conclusion, it should be mentioned that conventionally, generic bearing assemblies are designed in such a way that shaft 1 is grounded. In other words, a bearing assembly according to the present invention in this case includes a voltage source which is designed and arranged in such a way that it can build up an electrical potential between electrodes 5 and the ground. If shaft 1 is not grounded, then the voltage source must be connectable or connected to electrodes 5 as well as to shaft 1.

COMPONENT IDENTIFICATION LIST 1 shaft
2 housing
3 oil bath
4 support structure
5 electrode
6 seal
7 seal
8 drainage channel
9 siphon While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:
1. A bearing assembly, comprising:
a shaft;
a housing, wherein an oil bath is arranged inside the housing;
a support structure which is connected to the housing and arranged around the shaft;
at least one first seal which is supported by the support structure and which extends between the support structure and the shaft;
at least one electrode which is connected to the support structure and arranged between the support structure and the shaft in such a way that an oil vapor from the oil bath, which passes through the at least one first seal, must pass through a gap between the at least one electrode and the shaft in order to escape, the bearing assembly being configured for an electrical voltage to be applied between the at least one electrode and the shaft so as to direct a plurality of oil particles contained in the oil vapor onto the at least one electrode such that the plurality of oil particles are separated at the at least one electrode; and
at least one drainage channel configured for enabling oil separated at the at least one electrode to flow through the at least one drainage channel into the oil bath.

2. The bearing assembly according to claim 1, further comprising a second seal which is supported by the support structure and extends between the support structure and the shaft, wherein the second seal is arranged beyond the at least one electrode when viewed from the at least one first seal.

3. The bearing assembly according to claim 1, further comprising a siphon which is arranged in the at least one drainage channel, wherein the siphon is arranged and configured for being filled with oil deposited at the at least one electrode and thereby for sealing the at least one drainage channel such that the oil vapor from the oil bath is not able to pass therethrough.

4. The bearing assembly according to claim 1, wherein the shaft is arranged horizontally.

5. The bearing assembly according to claim 1, wherein the shaft is arranged vertically.

6. The bearing assembly according to claim 5, further comprising a device configured for collecting the oil separated at the at least one electrode.

7. The bearing assembly according to claim 6, wherein the device configured for collecting the oil separated at the at least one electrode includes a projection of the support structure, wherein the projection is arranged and configured for the oil separated at the at least one electrode to drip onto the projection.

* * * * *